UNITED STATES PATENT OFFICE.

ALBERT LAKE, OF WASHINGTON, DISTRICT OF COLUMBIA.

MOLD FOR ARTIFICIAL STONE.

No. 819,769.   Specification of Letters Patent.   Patented May 8, 1906.

Application filed November 4, 1903. Serial No. 179,856.

*To all whom it may concern:*

Be it known that I, ALBERT LAKE, a citizen of the United States, residing at Washington, District of Columbia, have invented certain new and useful Improvements in Molds for Artificial Stone; and I do hereby declare the following to be a full, clear, and exact description of the invention, such as will enable others skilled in the art to which it appertains to make and use the same.

My invention relates to molds for making artificial stone, and has for its object the production of a mold of plastic material that can be shaped to any of the forms used for building purposes and which after the molding of the stone and the stone has acquired a set can be removed and modeled into other shapes without further treatment, at the same time permitting the use of cheap material within the means of stone-makers.

I am aware that plastic materials have been used for making molds; but such plastics have been hardened before being used, such as baked or hardened clay, which after being once baked is unfit for use or if dried must be run through a pug-mill with water before being suitable for reusing. Furthermore, a large clay mold that is dried will crack and be rendered unfit for use. Plaster has also been used, but must be dehydrated and ground fine before it is in condition for reuse, and molds of collogens, such as gelatin and glue, must be cleaned, reheated, and strained to be used again. Sand has been used; but the objection to this mold is that a cement mixture that is wet enough to flow when run in a sand mold will be partly absorbed by the sand, the more liquid cement being drawn by capillarity toward the walls of the mold, making the surface layers of the stone too rich in cement and causing them to check or chip and oftentimes causing a part of the mold to adhere to the castings.

All of the above objections I overcome by using a mold of plastic argillaceous material, which may be either entirely of clay or part clay and sand or other filler. The material is used wet or of a consistency readily to be worked by the hands and is not hardened before use. By using the material of the mold wet or in a plastic state it will not further absorb moisture, so that when once filled more material will not have to be added to the mold after a short time, as is the case with dry or baked clay molds, plaster, sand, and the like.

The clay mold is sufficiently cheap to be used for molding ornate capitals, sills, columns, and other builder's stonework, at the same time adapted to reproduce exactly the lines of ornate patterns. The plastic clay or mixture of clay and sand is placed around the pattern and the pattern then removed, and I then preferably, but not necessarily, wet the surfaces of the mold and then introduce the cement mixture, preferably in the manner described in my United States Patent No. 743,525, dated November 10, 1903. After a few hours when the stone has acquired its initial set, if found desirable or necessary, I sprinkle the mold and stone with water to maintain the clay plastic. Such a mold will have a smooth molding-surface unless the pattern has an abraded or indented surface.

In order to produce a simulation to the surface of sandstone, I proceed as follows: After the pattern has been removed from the mold the surfaces are sponged over with water, and sand is then blown on them from a bellows or blower, the particles of sand partly entering the mold-walls and sticking thereto. The cement mixture is then put in. By using the clay or the clay mixed with sand in a plastic state, or "wet," as it is termed, I need have no care whatever as to the proportions of clay and sand or to carefully select a clay for fear of it being too fat. The mold is not allowed to dry out. Hence there is no danger of cracking, and at the same time the mold is ready for use as soon as the pattern is removed, there being no time required for the mold to set or harden before the molding operation can be begun.

In order to maintain the mold in a plastic state as long as possible, I use either alone or in part a water-absorbing filler, such as sawdust, and well wet it before mixing it with the clay or clay and sand. To further secure a moist or plastic mold, I add glycerin when desirable. The glycerin dissolved in water is either mixed directly with the clay or first with a single filler or a filler of mixed materials and then the filler mixed with the clay. Such a mold material containing a water absorbent will when sufficiently moist remain so for a long time, maintain the mold in a plastic state, and yet not absorb moisture from the cement material poured into it.

Having thus described my invention, what I claim as new therein, and desire to secure by Letters Patent, is—

1. A plastic mold for artificial stone, composed of a plastic material mixed with a filler maintained in a plastic state and whose molding-surfaces have sand blown into them so that the particles of sand will partly project from the molding-surfaces, thereby producing a mold in which undercut surfaces can be molded, a liquid cement mixture can be used to form the stone so as not to distort the undercut molding-surfaces, to produce a stone simulating natural sandstone by reason of the projecting particles of sand from the molding-surfaces, and after the stone is set the plastic mold can be broken from the stone and reused.

2. A mold for artificial stone, composed of an argillaceous material mixed with an absorbing and a non-absorbing filler, and chemical compound capable of retaining water, substantially as described.

3. The method of making artificial stone, which consists in forming a plastic mold of a plastic material, blowing sand into the molding-surfaces and filling in the mold to the required depth with a cement mixture capable of being poured, substantially as described.

4. The method of making artificial stone, which consists in forming a plastic mold of plastic clay, blowing sand into the molding-surfaces, and pouring into the mold a suitable cement mixture, substantially as described.

5. The method of making artificial stone, which consists in forming a plastic mold of a plastic material mixed with an absorbing and a non-absorbing filler, preparing the molding surfaces to produce indented surfaces simulating natural stone, substantially as described.

In testimony that I claim the foregoing as my invention I have signed my name in presence of two subscribing witnesses.

ALBERT LAKE.

Witnesses:
HENRY ORTH, Jr.,
HARRY L. AMER.